(12) United States Patent
Ochiai

(10) Patent No.: US 11,260,948 B2
(45) Date of Patent: Mar. 1, 2022

(54) OUTBOARD MOTOR

(71) Applicant: YAMAHA HATSUDOKI KABUSHIKI KAISHA, Iwata (JP)

(72) Inventor: Katsumi Ochiai, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 142 days.

(21) Appl. No.: 15/784,247

(22) Filed: Oct. 16, 2017

(65) Prior Publication Data

US 2018/0105249 A1 Apr. 19, 2018

(30) Foreign Application Priority Data

Oct. 17, 2016 (JP) .............................. JP2016-203773

(51) Int. Cl.
| | | |
|---|---|---|
| *B63H 20/28* | (2006.01) | |
| *F02B 29/04* | (2006.01) | |
| *F02B 33/00* | (2006.01) | |
| *F01P 3/20* | (2006.01) | |
| *F02B 33/34* | (2006.01) | |
| *F02B 61/04* | (2006.01) | |

(52) U.S. Cl.
CPC ............. *B63H 20/28* (2013.01); *F02B 29/04* (2013.01); *F02B 33/00* (2013.01); *F01P 3/202* (2013.01); *F02B 33/34* (2013.01); *F02B 61/045* (2013.01); *Y02T 10/12* (2013.01)

(58) Field of Classification Search
CPC .. F01N 3/005; F02M 25/028; F02M 25/0221; F02M 26/35; F02D 2200/602; F02B 33/00; F02B 29/04; F01P 3/202
USPC .............. 123/41.31; 440/89 F, 88 M; 60/309
See application file for complete search history.

(56) References Cited

U.S. PATENT DOCUMENTS

| | | | | |
|---|---|---|---|---|
| 1,868,355 | A * | 7/1932 | Goldberg ................ | F01N 13/10 60/323 |
| 2,142,268 | A * | 1/1939 | Gibbs, Jr. ............... | F01N 3/043 440/89 R |
| 2,275,634 | A * | 3/1942 | Leipert ................... | F01N 3/046 60/309 |
| 3,772,887 | A * | 11/1973 | Ziegler ................... | F02B 75/20 60/313 |
| 4,167,919 | A * | 9/1979 | Woolley .................. | F02B 47/02 123/1 A |

(Continued)

FOREIGN PATENT DOCUMENTS

| | | |
|---|---|---|
| CN | 1521035 A | 8/2004 |
| CN | 203614209 U | 5/2014 |

(Continued)

OTHER PUBLICATIONS

Joseph, Autoblog, "BMW 1 Series prototype packs direct water injection", http://jp.autoblog.com/2015/07/05/bmw-direct-water-injection/, Jul. 2, 2015, pp. 1-4.

*Primary Examiner* — Logan M Kraft
*Assistant Examiner* — Joshua Campbell
(74) *Attorney, Agent, or Firm* — Keating and Bennett, LLP

(57) ABSTRACT

An outboard motor includes an engine, a supercharger that compresses air to be supplied to an air intake of the engine, and a cooler that cools the air compressed by the supercharger. The compressed air is cooled by spraying water obtained by condensing water vapor produced by combustion in the engine to the cooler.

13 Claims, 2 Drawing Sheets

(56) References Cited

U.S. PATENT DOCUMENTS

| | | | | |
|---|---|---|---|---|
| 4,179,892 A | * | 12/1979 | Heydrich | F02B 37/025 60/605.2 |
| 4,279,223 A | * | 7/1981 | Csonka | F02M 25/0222 123/25 N |
| 4,503,813 A | * | 3/1985 | Lindberg | F02M 26/36 123/25 E |
| 4,579,090 A | | 4/1986 | Konrath et al. | |
| 4,741,162 A | | 5/1988 | Torigai | |
| 4,827,722 A | | 5/1989 | Torigai | |
| 5,239,950 A | | 8/1993 | Takahashi | |
| 5,293,846 A | | 3/1994 | Takahashi | |
| 6,347,605 B1 | * | 2/2002 | Wettergard | F02M 31/10 123/25 B |
| 6,405,692 B1 | | 6/2002 | Christiansen | |
| 7,100,584 B1 | | 9/2006 | Bruestle et al. | |
| 7,146,938 B2 | * | 12/2006 | Sundholm | F02M 25/0227 123/25 A |
| 7,451,750 B1 | * | 11/2008 | Fox | F02B 29/0468 123/568.12 |
| 2006/0266307 A1 | * | 11/2006 | Mezheritsky | F02M 25/0227 123/25 C |
| 2007/0107424 A1 | | 5/2007 | Wizgall et al. | |
| 2009/0205326 A1 | * | 8/2009 | Watson | F02B 37/001 60/309 |
| 2009/0223206 A1 | * | 9/2009 | Peters | F01N 13/009 60/285 |
| 2011/0100341 A1 | * | 5/2011 | Yacoub | F02D 41/0065 123/568.11 |
| 2011/0168128 A1 | * | 7/2011 | Bradley | F01N 3/005 123/294 |
| 2011/0225959 A1 | * | 9/2011 | Sailer | F02M 26/28 60/309 |

FOREIGN PATENT DOCUMENTS

| | | | | |
|---|---|---|---|---|
| DE | 34 07 570 C1 | | 8/1985 | |
| DE | 19918591 A1 | * | 10/2000 | ........... F01N 3/2066 |
| DE | 19918591 A1 | * | 10/2000 | ........... F01N 3/2066 |
| DE | 103 20 867 A1 | | 12/2004 | |
| EP | 0 380 883 A1 | | 8/1990 | |
| GB | 254480 A | | 7/1926 | |
| JP | 2001-123845 A | | 5/2001 | |
| JP | 2001123845 A | * | 5/2001 | ........... F02B 61/045 |
| JP | 2001123845 A | * | 5/2001 | ........... F02B 61/045 |
| JP | 2004293404 A | * | 10/2004 | |
| JP | 2012180756 A | * | 9/2012 | |
| JP | 2012180756 A | * | 9/2012 | |

* cited by examiner

OUTBOARD MOTOR

CROSS REFERENCE TO RELATED APPLICATIONS

This application claims the benefit of priority to Japanese Patent Application No. 2016-203773 filed on Oct. 17, 2016. The entire contents of this application are hereby incorporated herein by reference.

BACKGROUND OF THE INVENTION

1. Field of the Invention

The present invention relates to an outboard motor, and more particularly, it relates to an outboard motor including a supercharger.

2. Description of the Related Art

An outboard motor including a supercharger is known in general. Such an outboard motor is disclosed in Japanese Patent Laid-Open No. 2001-123845, for example.

Japanese Patent Laid-Open No. 2001-123845 discloses an outboard motor including an engine, a supercharger that compresses air to be supplied to an air intake of the engine, and a cooler that cools the air compressed by the supercharger.

However, in the conventional outboard motor described in Japanese Patent Laid-Open No. 2001-123845, when the output of the engine is further improved by supercharging, it is necessary to efficiently reduce the temperature of the compressed intake air in order to significantly reduce or prevent knocking, and hence it is necessary to further increase the capacity of the cooler. Therefore, the outboard motor is disadvantageously increased in size.

SUMMARY OF THE INVENTION

Preferred embodiments of the present invention provide an outboard motor that efficiently lowers the temperature of intake air while an increase in the size of the outboard motor is significantly reduced or prevented.

An outboard motor according to a preferred embodiment of the present invention includes an engine, a supercharger that compresses air to be supplied to an air intake of the engine, and a cooler that cools the air compressed by the supercharger, wherein the compressed air is cooled by spraying water obtained by condensing water vapor produced by combustion in the engine to the cooler.

In an outboard motor according to a preferred embodiment of the present invention, the compressed air is cooled by spraying the water obtained by condensing the water vapor produced by combustion in the engine to the cooler. Thus, the water evaporates such that the heat of the cooler is efficiently removed, and hence the temperature of intake air is efficiently lowered without increasing the capacity of the cooler. Consequently, the temperature of the intake air is efficiently lowered while an increase in the size of the outboard motor is significantly reduced or prevented. The water obtained by condensing the water vapor produced by combustion in the engine is used, and hence no salt is deposited on the cooler unlike the case where seawater outside the outboard motor is used. Thus, no extraneous material such as salt is accumulated on the cooler, and hence a reduction in the efficiency of the cooler is significantly reduced or prevented. The water obtained by condensing the water vapor produced by combustion in the engine is used, and hence it is not necessary for a user to refill water used to cool the cooler.

An outboard motor according to a preferred embodiment of the present invention preferably further includes a cooling water passage that guides the water to the cooler. Accordingly, the water is easily supplied to the pressurized high-temperature intake air through the cooling water passage, and hence the pressurized high-temperature intake air is easily cooled by the water.

In the structure including the cooling water passage, a first end of the cooling water passage is preferably connected to an exhaust flow path through which exhaust gas of the engine passes. Accordingly, the water obtained by condensing moisture contained in the exhaust gas of the engine is guided from the exhaust flow path to the cooling water passage, and hence the water used to cool the pressurized high-temperature intake air is easily collected while accumulation of the water in the exhaust flow path is significantly reduced or prevented.

In this case, the engine preferably includes a plurality of cylinders disposed in a vertical direction, and the first end of the cooling water passage is preferably connected to a lower portion of the exhaust flow path that corresponds to a lowermost one of the plurality of cylinders. Accordingly, the water contained in the exhaust gas discharged from all of the plurality of cylinders including the lowermost cylinder is collected and guided to the cooling water passage, and hence the water is efficiently collected.

In the structure including the cooling water passage, an outboard motor according to a preferred embodiment of the present invention preferably further includes a storage that is disposed in the cooling water passage and stores the water. When the moisture in the exhaust gas is likely to condense, the temperature of the engine is low, and hence there is no need to further cool the intake air. That is, the timing at which the water is produced and the timing at which the water is used to cool the cooler are not in the same period. The outboard motor includes the storage such that the water is stored when the moisture in the exhaust gas is likely to condense, and the water stored in the storage is used to cool the pressurized high-temperature intake air when it is necessary to further cool the intake air.

In the structure including the storage, an outboard motor according to a preferred embodiment of the present invention preferably further includes a return passage that connects an upper portion of the storage to an exhaust flow path through which exhaust gas of the engine passes, and the return passage is preferably connected at a position downstream of a position where the cooling water passage is connected to the exhaust flow path. Accordingly, when the storage is filled with the water, the water is returned through the return passage to the exhaust flow path at a position downstream of the position where the cooling water passage is connected to the exhaust flow path, and hence backflow of the water into the engine through the cooling water passage is significantly reduced or prevented. Degassing is performed through the return passage, and hence an increase in the pressure inside the storage is significantly reduced or prevented. Thus, the water in the cooling water passage is easily transferred to the storage.

In this case, an outboard motor according to a preferred embodiment of the present invention preferably further includes a catalyst disposed in the exhaust flow path, and the return passage is preferably connected at a position downstream of the catalyst in the exhaust flow path. Accordingly, the flow of the water through the catalyst is significantly reduced or prevented, and hence the effect of the catalyst is efficiently achieved.

In the structure including the storage, a controller is configured or programmed to control a supply of the water to be sprayed to the cooler, wherein the water is preferably supplied to the storage when a load on the engine is low, and the controller preferably supplies the water in the storage to the cooler when the load on the engine is high. Accordingly, when the load is low and the water in the exhaust gas of the engine is likely to condense, the water is stored in the storage, and when the load is high and it is desired to further cool the intake air, the pressurized high-temperature intake air is cooled by the water supplied from the storage.

In the structure including the cooling water passage, an outboard motor according to a preferred embodiment of the present invention preferably further includes a water injector that is connected to a second end of the cooling water passage and sprays the water toward the cooler. Accordingly, the water is sprayed to the cooler, and hence the water is evaporated, and the pressurized high-temperature intake air is efficiently cooled due to the latent heat of vaporization. Thus, the capacity of the cooler is reduced.

In this case, an outboard motor according to a preferred embodiment of the present invention preferably further includes a water pump that pumps the water to the water injector. Accordingly, the water pump is driven such that the water is easily supplied to the cooler.

An outboard motor according to a preferred embodiment of the present invention preferably further includes a filter that removes impurities from the water. Accordingly, the impurities contained in the exhaust gas of the engine are removed by the filter, and hence adhesion of extraneous material to the cooler to which the water is sprayed is significantly reduced or prevented.

An outboard motor according to a preferred embodiment of the present invention preferably further includes a controller configured or programmed to control a supply of the water to be sprayed to the cooler based on a user's acceleration/deceleration operation. Accordingly, when the load on the engine increases due to the acceleration operation, the pressurized high-temperature intake air is quickly cooled by the water, and hence the output of the engine is quickly increased.

In this case, the controller is preferably configured or programmed to control the supply of the water to be sprayed to the cooler based on a temperature of intake air to be supplied to the engine. Accordingly, the pressurized high-temperature intake air is cooled by the water when the temperature of the intake air increases, and hence an increase in the temperature of the intake air is easily significantly reduced or prevented.

In an outboard motor according to a preferred embodiment of the present invention, the compressed air is preferably cooled by spraying the water into the air intake of the engine. Accordingly, the water is evaporated such that the pressurized high-temperature intake air in the air intake is efficiently cooled.

The above and other elements, features, steps, characteristics and advantages of preferred embodiments of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of an outboard motor 100 according to various preferred embodiments of the present invention is now described with reference to FIGS. 1 to 3. In the figures, arrow FWD represents the forward movement direction (front) of a vessel body 200 on which the outboard motor 100 is provided, and arrow BWD represents the reverse movement direction (back) of the vessel body 200.

Figure 1:
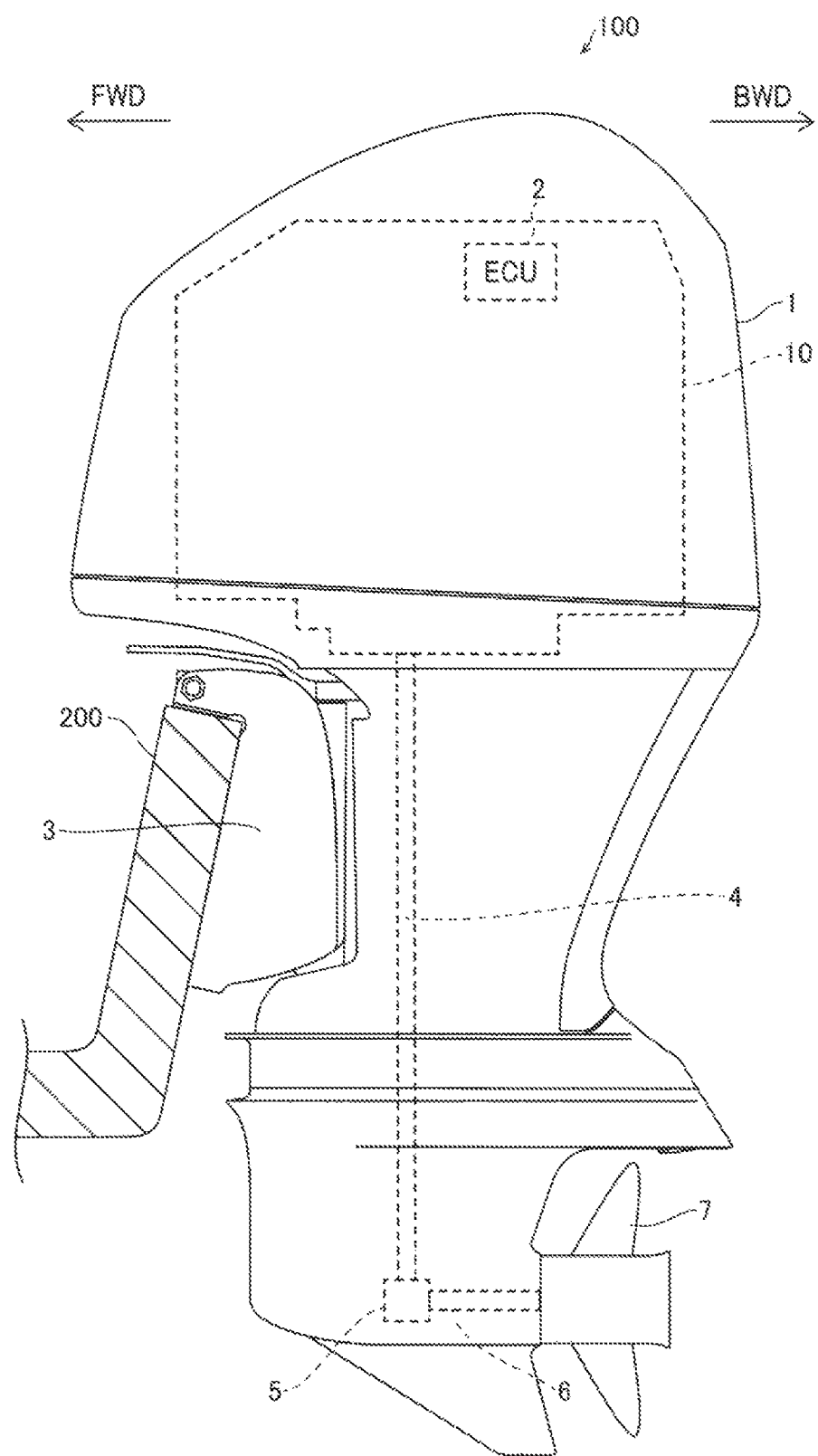
FIG. 1 is a side elevational view schematically showing an outboard motor according to a preferred embodiment of the present invention.

As shown in FIG. 1, the outboard motor 100 includes an engine 10, a housing 1, and an ECU (engine control unit) 2. The outboard motor 100 is mounted on a rear portion of the vessel body 200. The outboard motor 100 further includes a bracket 3, a drive shaft 4, a gearing 5, a propeller shaft 6, and a propeller 7. The outboard motor 100 is mounted on the vessel body 200 to be rotatable about a vertical axis and a horizontal axis by the bracket 3. The ECU 2 is an example of a "controller".

Figure 3:
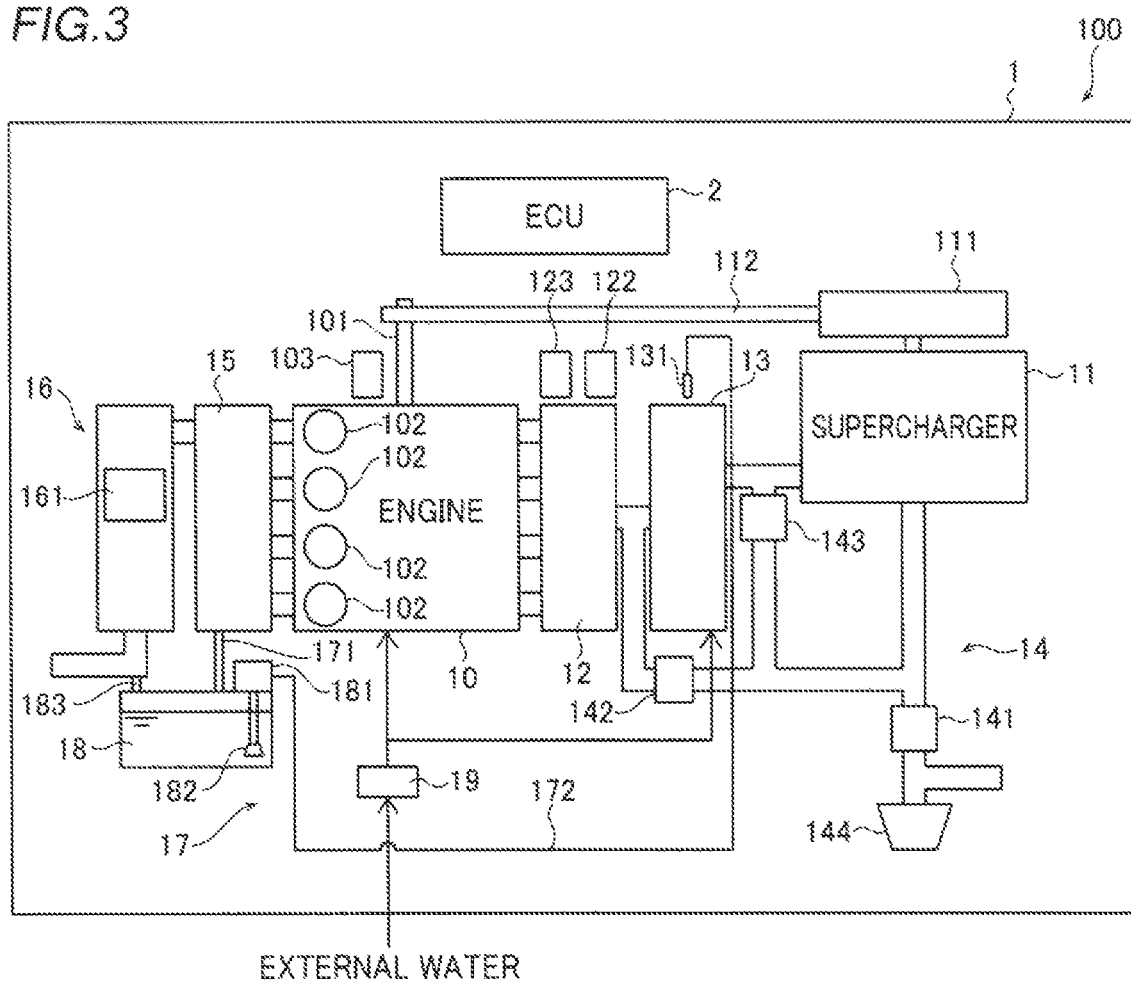
FIG. 3 is a block diagram showing an outboard motor according to a preferred embodiment of the present invention.

As shown in FIG. 3, the outboard motor 100 further includes a supercharger 11, an intake manifold 12, a cooler 13, an intake passage 14, an exhaust manifold 15, an exhaust passage 16, a cooling water passage 17, a storage 18, and a water pump 19. The intake manifold 12 is an example of an "air intake". The exhaust manifold 15 and the exhaust passage 16 are examples of an "exhaust flow path".

Figure 2:
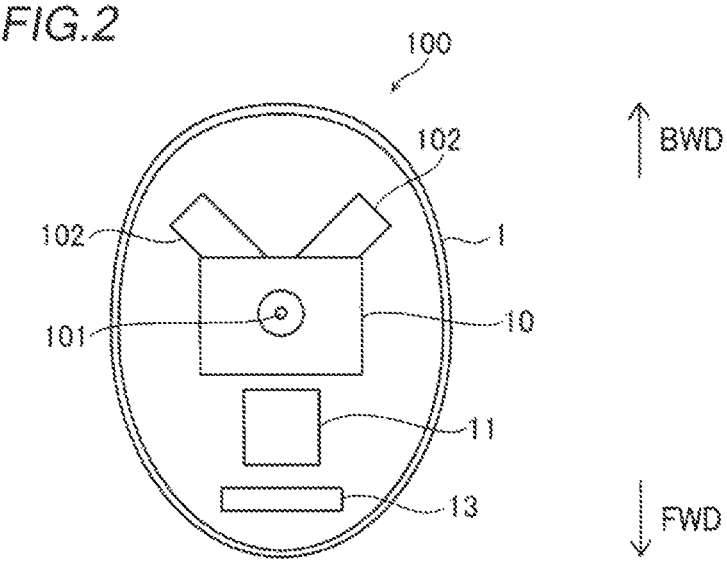
FIG. 2 is a plan view showing the vicinity of an engine inside an outboard motor according to a preferred embodiment of the present invention.

As shown in FIGS. 2 and 3, the engine 10 includes a crankshaft 101 and a plurality of cylinders 102. As shown in FIG. 3, the engine 10 includes an engine speed sensor 103 that detects the rotational speed of the engine 10. The supercharger 11 includes a clutch 111. The clutch 111 is connected to the crankshaft 101 such that power is transmitted from the crankshaft 101 by a power transmission 112. The intake manifold 12 includes an intake pressure sensor 122 that detects the pressure of intake air and an intake temperature sensor 123 that detects the temperature of intake air.

The cooler 13 includes a water injector 131 that sprays water. In the intake passage 14, a throttle valve 141, a bypass valve 142, a relief valve 143, and a filter 144 are provided. In the exhaust passage 16, a catalyst 161 is provided.

The cooling water passage 17 includes a passage 171 and a passage 172. The storage 18 includes a water pump 181, a filter 182, and a return passage 183.

The engine 10 is provided in an upper portion of the outboard motor 100, and includes an internal combustion engine driven by explosive combustion of gasoline, light oil, or the like. The engine 10 is driven by a supercharging operation. The crankshaft 101 is rotationally driven by the driving force of the engine 10. For example, four cylinders 102 are provided. The plurality of cylinders 102 are disposed in a vertical direction. As shown in FIG. 2, the plurality of cylinders 102 are preferably disposed in a V-shape. That is, the engine 10 is preferably a V-type or V-shaped engine. The engine speed sensor 103 detects the rotational speed of the engine 10. The engine speed sensor 103 transmits the detected rotational speed of the engine 10 to the ECU 2.

The housing 1 covers the engine 10. At least the engine 10, the ECU 2, the supercharger 11, the intake manifold 12, the cooler 13, the exhaust manifold 15, the exhaust passage 16, the cooling water passage 17, and the storage 18 are disposed inside the housing 1.

The ECU 2 is configured or programmed to control each element of the outboard motor 100. The ECU 2 is configured or programmed to control the driving of the engine 10. The ECU 2 is configured or programmed to control the driving of the supercharger 11. The ECU 2 is configured or programmed to control the opening and closing of the throttle valve 141. The ECU 2 is configured or programmed to control the opening and closing of the bypass valve 142. The ECU 2 is configured or programmed to control the switching on and off of the clutch 111. The ECU 2 is configured or programmed to control the driving of the water pump 181.

As shown in FIG. 1, the drive shaft 4 is connected to the crankshaft 101 of the engine 10 to transmit the power of the engine 10. The drive shaft 4 extends in the vertical direction.

The gearing 5 is disposed in a lower portion of the outboard motor 100. The gearing 5 reduces the rotational speed of the drive shaft 4 and transmits the reduced rotational speed to the propeller shaft 6. That is, the gearing 5 transmits, to the propeller shaft 6 that rotates about a rotation axis that extends in a front-back direction, the drive force of the drive shaft 4 that rotates about a rotation axis that extends in the vertical direction.

Specifically, the gearing 5 includes a pinion gear, a forward movement bevel gear, a reverse movement bevel gear, and a dog clutch. The pinion gear is mounted on a lower end of the drive shaft 4. The forward movement bevel gear and the reverse movement bevel gear are provided on the propeller shaft 6 to hold the pinion gear therebetween. The pinion gear meshes with the forward movement bevel gear and the reverse movement bevel gear. The gearing 5 switches between a state where the dog clutch that rotates integrally with the propeller shaft 6 engages with the forward movement bevel gear and a state where the dog clutch engages with the reverse movement bevel gear so as to switch the shift position (the rotation direction (the forward movement direction and the reverse movement direction) of the propeller shaft 6). The gearing 5 switches to a state where the dog clutch engages with neither the forward movement bevel gear nor the reverse movement bevel gear so as to change the shift position to neutral. The meshing of the gearing 5 is controlled by the ECU 2 such that the shift position is switched to the forward movement direction, reverse movement direction, or neutral.

The propeller 7 (screw) is connected to the propeller shaft 6. The propeller 7 is driven to rotate about the rotation axis that extends in the front-back direction. The propeller 7 rotates in water to generate a thrust force in an axial direction. The propeller 7 moves the vessel body 200 forward or reversely according to the rotation direction.

As shown in FIG. 3, the supercharger 11 compresses air to be supplied to the intake manifold 12 of the engine 10. The supercharger 11 is rotationally driven by the engine 10. Specifically, a driving force produced by the rotation of the crankshaft 101 is transmitted to the supercharger 11 through the power transmission 112 and the clutch 111 to rotationally drive the supercharger 11. That is, the supercharger 11 is a mechanical supercharger. The supercharger 11 compresses the air to be supplied to the intake manifold 12 by rotating a pair of rotors or impellers. The supercharger 11 may be of a centrifugal type, Roots type, screw type, or the like, for example. Air is supplied to the supercharger 11 through the throttle valve 141, and the compressed air is sent to the cooler 13.

The clutch 111 switches between driving and stopping of the supercharger 11. Specifically, the clutch 111 is turned on to drive the supercharger 11, and is turned off to stop the supercharger 11. The clutch 111 preferably includes an electromagnetic clutch, for example, and the clutch 11 is switched on and off under the control of the ECU 2. When the clutch 111 is turned on, the drive force of the engine 10 is transmitted to the supercharger 11 through the power transmission 112. When the clutch 111 is turned off, the drive force through the power transmission 112 is not transmitted to the supercharger 11.

The power transmission 112 transmits the rotational drive force of the crankshaft 101 to the clutch 111. The power transmission 112 includes a belt pulley mechanism, a chain, a gear mechanism, or the like, for example.

The intake manifold 12 distributes and supplies air to each cylinder of the engine 10. The air is supplied from the cooler 13 to the intake manifold 12, and the intake manifold 12 supplies the air to the engine 10.

The intake pressure sensor 122 detects the intake pressure of the intake manifold 12. The intake pressure sensor 122 transmits the detected intake pressure to the ECU 2. The intake temperature sensor 123 detects the intake temperature of the intake manifold 12. The intake temperature sensor 123 transmits the detected intake temperature to the ECU 2.

The cooler 13 cools the air compressed by the supercharger 11. The cooler 13 cools the air compressed by the supercharger 11 with cooling water pumped by the water pump 19 driven by the engine 10. Specifically, in the cooler 13, the compressed air that flows through the cooler 13 and the cooling water pumped by the water pump 19 exchange heat with each other through a heat radiator such as a fin such that the compressed air is cooled. That is, the cooler 13 is water-cooled. Due to the cooler 13, the temperature of the air to be supplied to the engine 10 is lowered, and the density of the air is increased. As shown in FIG. 3, the compressed air is supplied from the supercharger 11 to the cooler 13, and the cooler 13 supplies the cooled air to the intake manifold 12. The cooler 13 may be air-cooled.

According to a preferred embodiment of the present invention, water obtained by condensing water vapor produced by combustion in the engine 10 is sprayed to the cooler 13. Specifically, when it is desired to cool the further compressed high-temperature intake air with the cooler 13, the water is sprayed to the cooler 13, and the pressurized high-temperature intake air is cooled. Thus, the water vaporizes to deprive latent heat of vaporization from the pressurized high-temperature intake air. The water is sprayed toward the cooler 13 by the water injector 131 connected to the cooling water passage 17. The water injector 131 is connected to an end of the cooling water passage 17 near the cooler 13.

The water may be sprayed to an upstream side of the cooler 13, but the water is preferably directly sprayed to the cooler 13 such that the air, the temperature of which is high (has not yet been lowered), enters the cooler 13, and hence a difference in temperature between the compressed air at an inlet of the cooler 13 and a fluid (the cooling water and water) to exchange heat is increased. This makes it possible to increase the heat exchange efficiency of the cooler 13.

Air is supplied to the engine 10 through the intake passage 14. The throttle valve 141 adjusts the amount of air to be supplied to the intake manifold 12 of the engine 10. Specifically, the throttle opening degree of the throttle valve 141 is adjusted under the control of the ECU 2. The opening and closing of the throttle valve 141 is controlled based on the user's operation. New air through the filter 144 and blow-by gas are supplied to the throttle valve 141.

The bypass valve 142 returns the air excessively compressed by the supercharger 11 to a portion upstream of the supercharger 11. That is, the bypass valve 142 adjusts the intake pressure of the intake manifold 12. Specifically, when the intake pressure is higher than a target value, the bypass valve 142 is controlled to be opened. On the other hand, when the intake pressure is lower than the target value, the bypass valve 142 is controlled to be closed.

When the air is compressed to a predetermined pressure or higher by the supercharger 11, the relief valve 143 opens to release an excessive pressure. The relief valve 143 preferably includes a mechanical valve.

The filter 144 is provided upstream of the throttle valve 141. The filter 144 prevents extraneous material from entering the air to be supplied to the engine 10.

The exhaust manifold 15 merges exhaust gas from each of the cylinders 102 of the engine 10. Exhaust gas is introduced into the exhaust manifold 15 from the engine 10, and the exhaust manifold 15 sends the exhaust gas to the exhaust passage 16.

The exhaust passage 16 guides the exhaust gas of the engine 10 to the outside of the outboard motor 100. The exhaust gas that passes through the exhaust passage 16 is discharged to the outside of the outboard motor 100 together with water that has cooled the engine 10.

The catalyst 161 purifies the exhaust gas of the engine 10. The catalyst 161 is disposed in the exhaust passage 16. The catalyst 161 decreases a predetermined component contained in the exhaust gas of the engine 10 to some extent or to zero by oxidation or reduction. The catalyst 161 oxidizes to, for example, water and carbon dioxide the hydrocarbons and carbon monoxide that have not been completely burned in the engine 10 or have been generated by reactions in the engine 10. For example, the catalyst 161 reduces nitrogen oxide to nitrogen gas. The catalyst 161 includes platinum, palladium, or the like, for example.

According to a preferred embodiment of the present invention, the cooling water passage 17 guides the water obtained by condensing the water vapor produced by combustion in the engine 10 to the cooler 13. In the engine 10, a fuel including hydrocarbons such as gasoline or light oil is burned, and hence water is produced by the combustion. Although the water produced by the combustion is in a gas state, the engine 10, the exhaust manifold 15, and the exhaust passage 16 are cooled such that the exhaust gas containing water (water vapor) is cooled and condensed to become liquid water (water). Water is likely to be produced particularly during idling of the engine 10 or during low load operation. When the water temperature and the outside air temperature are low, such as in the winter, the exhaust gas is likely to be cooled, and hence water is also likely to be produced. Water is produced by combustion, and hence the water contains almost no salt or minerals.

A first end of the cooling water passage 17 is connected to the exhaust manifold 15 through which the exhaust gas of the engine 10 passes. Specifically, the first end of the cooling water passage 17 is connected to a lower portion of the exhaust manifold 15 that corresponds to the lowermost one of the cylinders 102. The water injector 131 is connected to a second end of the cooling water passage 17.

The passage 171 connects the exhaust manifold 15 to the storage 18. That is, the water collected in the lower portion of the exhaust manifold 15 moves to the storage 18 through the passage 171. A check valve that limits the moving direction of the water to a direction from the exhaust manifold 15 to the storage 18 may be provided in the passage 171. Thus, backflow of the water from the storage 18 to the engine 10 through the exhaust manifold 15 is significantly reduced or prevented.

The passage 172 connects the storage 18 to the water injector 131. That is, the water stored in the storage 18 is sprayed to the cooler 13 through the passage 172 and the water injector 131.

According to a preferred embodiment of the present invention, the storage 18 is disposed in the cooling water passage 17, and stores the water. When a load on the engine 10 is low, the water is supplied to the storage 18. When the load on the engine 10 is high, the water in the storage 18 is sprayed to the cooler 13. That is, when the load on the engine 10 is low and the temperature of the exhaust gas is low, the water in the exhaust gas is aggregated and stored in the storage 18. On the other hand, when the load on the engine 10 is high and the temperature of the intake air is high, the water in the storage 18 is sprayed to the cooler 13, and the pressurized high-temperature intake air is cooled.

The water pump 181 pumps the water to the water injector 131. Specifically, the water pump 181 is provided in the storage 18, and pumps the water stored in the storage 18 to the water injector 131. The water pump 181 is driven under the control of the ECU 2. The water pump 181 includes an electrically powered pump, for example. The water pump 181 is connected to the passage 172. The water pump 181 suctions the water through the filter 182 and pumps the water to the water injector 131 through the passage 172.

The filter 182 removes impurities from the water. Specifically, the filter 182 is provided in the storage 18. In the filter 182, soot, oils, etc. mixed in the exhaust gas are removed, for example. The filter 182 is replaceably mounted. In other words, a user only needs to periodically replace the filter 182, and there is no need to refill water to cool the pressurized high-temperature intake air.

The return passage 183 connects an upper portion of the storage 18 to the exhaust passage 16 through which the exhaust gas of the engine 10 passes. The return passage 183 is connected at a position downstream of a position where the cooling water passage 17 is connected to the exhaust flow path (the exhaust manifold 15 and the exhaust passage 16). Specifically, the return passage 183 is connected at a position downstream of the catalyst 161 in the exhaust passage 16. The return passage 183 is connected at a position below the position where the cooling water passage 17 (passage 171) is connected to the exhaust flow path (the exhaust manifold 15 and the exhaust passage 16). The water stored in the storage 18 overflows through the return passage 183. Gas in the storage 18 is also removed through the return passage 183.

The water pump 19 pumps external water to cool the engine 10, the cooler 13, the exhaust manifold 15, the exhaust passage 16, an oil pan, etc. The water pump 19 is driven by the rotation of the drive shaft 4. The water discharged from the water pump 19 flows through a flow path including a water jacket provided on the outer circumferences of the engine 10, the exhaust manifold 15, the exhaust passage 16, the oil pan, etc. and a heat exchanger of the cooler 13. The water that has been used to perform cooling is discharged to the outside together with the exhaust gas of the engine 10.

According to a preferred embodiment of the present invention, the ECU 2 is configured or programmed to control supply of the water to be sprayed to the cooler 13 based on the user's acceleration/deceleration operation. Specifically, when the user performs the acceleration operation, the compression rate of the intake air increases, and when the temperature of the intake air is likely to increase above a predetermined value, the ECU 2 drives the water pump 181 and the water injector 131 to spray the water to the cooler 13. That is, when it is desired to cool the further compressed high-temperature intake air with the cooler 13, the ECU 2 controls the supply of the water to be sprayed to the cooler 13. For example, the ECU 2 may determine whether or not it is necessary to supply the water for the acceleration operation with a map or a table stored in advance.

According to a preferred embodiment of the present invention, the ECU 2 is configured or programmed to control supply of the water to be sprayed to the cooler 13 based on the temperature of the intake air to be supplied to the engine 10. Specifically, when the temperature of the intake air acquired by the intake temperature sensor 123 is higher than a predetermined value, the ECU 2 drives the water pump 181 and the water injector 131 to spray the water to the cooler 13. That is, when determining that cooling of the cooler 13 is insufficient, the ECU 2 controls supply of the water to be sprayed to the cooler 13.

According to the various preferred embodiments of the present invention described above, the following advantageous effects are achieved.

According to a preferred embodiment of the present invention, the pressurized high-temperature intake air is cooled by spraying the water obtained by condensing the water vapor produced by combustion in the engine 10 to the cooler 13. Thus, the water is sprayed to the cooler 13 such that the water evaporates, and hence the heat of the intake air is efficiently removed. Accordingly, the temperature of the intake air is efficiently lowered without increasing the capacity of the cooler 13. Consequently, the temperature of the intake air is efficiently lowered while an increase in the size of the outboard motor 100 is significantly reduced or prevented. Thus, when it is intended to increase the output of the engine 10, occurrence of knocking is significantly reduced or prevented, and hence the ignition timing is not retarded. Consequently, the output of the engine 10 is efficiently increased. The water obtained by condensing the water vapor produced by combustion in the engine 10 is used, and hence no salt is deposited on the cooler 13 unlike the case where seawater outside the outboard motor 100 is used. Thus, no extraneous material such as salt is accumulated on the cooler 13, and hence a reduction in the heat exchange efficiency of the cooler 13 is significantly reduced or prevented, and corrosion of the cooler material due to salt damage is prevented. The water obtained by condensing the water vapor produced by combustion in the engine 10 is used, and hence it is not necessary for the user to refill the water that cools the cooler.

According to a preferred embodiment of the present invention, the outboard motor 100 includes the cooling water passage 17 that guides the water to the cooler 13. Thus, the water is easily supplied to the cooler 13 through the cooling water passage 17, and hence the pressurized high-temperature intake air is easily cooled by the water.

According to a preferred embodiment of the present invention, the first end of the cooling water passage 17 is connected to the exhaust manifold 15 through which the exhaust gas of the engine 10 passes. Thus, the water obtained by condensing moisture contained in the exhaust gas of the engine 10 is guided from the exhaust manifold 15 to the cooling water passage 17, and hence the water to be used to cool the cooler 13 is easily collected while accumulation of the water in the exhaust manifold 15 is significantly reduced or prevented.

According to a preferred embodiment of the present invention, the first end of the cooling water passage 17 is connected to the lower portion of the exhaust manifold 15 that corresponds to the lowermost one of the cylinders 102. Thus, the water contained in the exhaust gas discharged from all of the plurality of cylinders 102 including the lowermost cylinder is collected and guided to the cooling water passage 17, and hence the water is efficiently collected.

According to a preferred embodiment of the present invention, the outboard motor 100 includes the storage 18 that is disposed in the cooling water passage 17 and stores the water. When the moisture in the exhaust gas is likely to condense, the temperature of the engine 10 is low, and hence there is no need to further cool the intake air. That is, the timing at which the water is produced and the timing at which the water is used to cool the cooler 13 are not in the same period. The outboard motor 100 includes the storage 18 such that the water is stored when the moisture in the exhaust gas is likely to condense, and the water stored in the storage 18 is used to cool the pressurized high-temperature intake air when it is necessary to further cool the intake air.

According to a preferred embodiment of the present invention, the return passage 183 that connects the upper portion of the storage 18 to the exhaust passage 16 through which the exhaust gas of the engine 10 passes is connected at the position downstream of the position where the cooling water passage 17 is connected to the exhaust flow path (the exhaust manifold 15 and the exhaust passage 16). Thus, when the storage 18 is filled with the water, the water is returned through the return passage 183 to the exhaust passage 16 at a position downstream of the position where the cooling water passage 17 is connected to the exhaust flow path (the exhaust manifold 15 and the exhaust passage 16), and hence backflow of the water into the engine 10 through the cooling water passage 17 is significantly reduced or prevented. Degassing is performed through the return passage 183, and hence an increase in the pressure inside the storage 18 is significantly reduced or prevented. Thus, the water in the cooling water passage 17 is easily transferred to the storage 18.

According to a preferred embodiment of the present invention, the return passage 183 is connected at the position downstream of the catalyst 161 in the exhaust passage 16. Thus, flow of the water through the catalyst 161 is significantly reduced or prevented, and hence the effect of the catalyst 161 is efficiently achieved.

According to a preferred embodiment of the present invention, the water is supplied to the storage 18 when the load on the engine 10 is low, and the water in the storage 18 is sprayed to the cooler 13 when the load on the engine 10 is high. Thus, when the load is low and the water in the exhaust gas of the engine 10 is likely to condense, the water is stored in the storage 18, and when the load is high and it is desired to further cool the intake air, the pressurized high-temperature intake air is cooled by the water supplied from the storage 18.

According to a preferred embodiment of the present invention, the outboard motor 100 includes the water injector 131 that is connected to the second end of the cooling water passage 17 and sprays the water toward the cooler 13. Thus, the water is sprayed to the cooler 13, and hence the water is easily evaporated. Accordingly, the amount of evaporation of the water is increased, and hence the pressurized high-temperature intake air is efficiently cooled by depriving the heat as latent heat of vaporization.

According to a preferred embodiment of the present invention, the outboard motor 100 includes the water pump 181 that pumps the water to the water injector 131. Thus, the water pump 181 and the water injector 131 are driven such that the water is easily sprayed to the cooler 13.

According to a preferred embodiment of the present invention, the outboard motor 100 includes the filter 182 that removes the impurities from the water. Thus, the impurities contained in the exhaust gas of the engine 10 are removed by the filter 182, and hence adhesion of extraneous material to the cooler 13 to which the water is sprayed is significantly reduced or prevented.

According to a preferred embodiment of the present invention, the outboard motor 100 includes the ECU 2 configured or programmed to control the supply of the water to be sprayed to the cooler 13 based on the user's acceleration/deceleration operation. Thus, when the load increases due to the acceleration operation, the pressurized high-temperature intake air is quickly cooled by the water, and hence the output of the engine 10 is quickly increased.

According to a preferred embodiment of the present invention, the ECU 2 is configured or programmed to control the supply of the water to be sprayed to the cooler 13 based on the temperature of the intake air to be supplied to the engine 10. Thus, the pressurized high-temperature intake air is cooled by the water when the temperature of the intake air increases, and hence an increase in the temperature of the intake air is easily significantly reduced or prevented.

According to a preferred embodiment of the present invention, the plurality of cylinders 102 are preferably disposed in a V-shape. Thus, in the V-type engine 10, the temperature of the intake air is efficiently lowered while an increase in the size of the outboard motor 100 is significantly reduced or prevented.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while one outboard motor is preferably provided on the vessel body in a preferred embodiment described above, the present invention is not restricted to this. According to a preferred embodiment of the present invention, a plurality of outboard motors may alternatively be provided on the vessel body.

While the supercharger is preferably rotationally driven by the driving force of the engine in a preferred embodiment described above, the present invention is not restricted to this. According to a preferred embodiment of the present invention, the supercharger may alternatively be driven by the exhaust gas of the engine. That is, an exhaust gas turbine supercharger may be used.

While the supercharger is preferably rotationally driven by the driving force of the engine in a preferred embodiment described above, the present invention is not restricted to this. According to a preferred embodiment of the present invention, the supercharger may alternatively be rotationally driven by the driving force of a motor.

While the outboard motor preferably includes the V-type engine including the four cylinders in a preferred embodiment described above, the present invention is not restricted to this. According to a preferred embodiment of the present invention, the engine may alternatively include at least one and not more than three cylinders, or may alternatively include five or more cylinders. Alternatively, an in-line engine in which a plurality of cylinders is disposed in a line may be used.

While the ECU as a controller is preferably provided in the housing of the outboard motor in a preferred embodiment described above, the present invention is not restricted to this. According to a preferred embodiment of the present invention, the controller may alternatively be disposed outside the outboard motor. For example, the controller may be provided on the vessel body.

While the water pump is preferably provided in the storage in a preferred embodiment described above, the present invention is not restricted to this. According to a preferred embodiment of the present invention, the water pump may alternatively be provided in the cooling water passage other than the storage.

While the filter is preferably provided in the storage in a preferred embodiment described above, the present invention is not restricted to this. According to a preferred embodiment of the present invention, the filter may alternatively be provided in the cooling water passage other than the storage.

While the water is preferably sprayed to the cooler in a preferred embodiment described above, the present invention is not restricted to this. According to a preferred embodiment of the present invention, the water injector may alternatively be mounted on the air intake downstream of the cooler, and the water may alternatively be sprayed into the air intake. That is, the compressed air may be cooled by spraying the water into the air intake of the engine.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   an engine including a crankshaft and a cylinder;
   a supercharger that compresses air to be supplied to an air intake of the engine;
   a cooler that cools the air compressed by the supercharger;
   an exhaust manifold through which an exhaust gas of the engine passes;
   an exhaust passage that guides the exhaust gas from the exhaust manifold to outside of the outboard motor;
   a storage to store condensed water obtained by condensing water vapor in the exhaust manifold and the exhaust passage, and produced by combustion in the engine; and
   a return passage to return the condensed water from the storage to the exhaust passage; wherein
   the compressed air is cooled by spraying the condensed water, that is obtained by condensing the water vapor in the exhaust manifold and the exhaust passage, to the cooler.

2. The outboard motor according to claim 1, further comprising:
   a cooling water passage including a condensed water passage to supply the condensed water from the exhaust manifold to the storage, the cooling water passage guiding the condensed water from the storage to the cooler; wherein
   a first end of the cooling water passage is connected to an exhaust flow path through which exhaust gas of the engine passes.

3. The outboard motor according to claim 2, wherein
the engine includes a plurality of cylinders, including the cylinder, disposed in a vertical direction; and
the first end of the cooling water passage is connected to a lower portion of the exhaust flow path that corresponds to a lowermost one of the plurality of cylinders.

4. The outboard motor according to claim 1, further comprising:
a cooling water passage including a condensed water passage to supply the condensed water from the exhaust manifold to the storage, the cooling water passage guiding the condensed water from the storage to the cooler; wherein
the storage is disposed in the cooling water passage.

5. The outboard motor according to claim 4, wherein
the return passage connects an upper portion of the storage to an exhaust flow path through which exhaust gas of the engine passes.

6. The outboard motor according to claim 5, further comprising a catalyst disposed in the exhaust flow path; wherein
the return passage is connected at a position downstream of the catalyst in the exhaust flow path.

7. The outboard motor according to claim 4, further comprising a controller configured or programmed to control a supply of the condensed water to be sprayed to the cooler; wherein
the condensed water is supplied to the storage when a load on the engine is low, and the controller supplies the condensed water in the storage to the cooler when the load on the engine is high.

8. The outboard motor according to claim 1, further comprising:
a cooling water passage including a condensed water passage to supply the condensed water from the exhaust manifold to the storage, the cooling water passage guiding the condensed water from the storage to the cooler; and
a water injector that is connected to an end of the cooling water passage and sprays the condensed water toward the cooler.

9. The outboard motor according to claim 8, further comprising a water pump that pumps the condensed water to the water injector.

10. The outboard motor according to claim 1, further comprising a filter that removes impurities from the condensed water.

11. The outboard motor according to claim 1, further comprising a controller configured or programmed to control a supply of the condensed water to be sprayed to the cooler based on a user's acceleration or deceleration operation.

12. The outboard motor according to claim 11, wherein the controller is configured or programmed to control the supply of the condensed water to be sprayed to the cooler based on a temperature of intake air to be supplied to the engine.

13. The outboard motor according to claim 1, wherein the compressed air is cooled by spraying the condensed water into the air intake of the engine.

* * * * *